(12) United States Patent
Kalia et al.

(10) Patent No.: US 9,881,509 B2
(45) Date of Patent: Jan. 30, 2018

(54) EDUCATIONAL TOY SIMULATOR

(71) Applicants: Navneet Kalia, Ho Chi Minh (VN); Devender Dutt Kalia, Rangareddy District (IN)

(72) Inventors: Navneet Kalia, Ho Chi Minh (VN); Devender Dutt Kalia, Rangareddy District (IN)

( * ) Notice: Subject to any disclaimer, the term of this patent is extended or adjusted under 35 U.S.C. 154(b) by 0 days.

(21) Appl. No.: 15/223,050

(22) Filed: Jul. 29, 2016

(65) Prior Publication Data
US 2017/0236430 A1    Aug. 17, 2017

(30) Foreign Application Priority Data

Feb. 13, 2016 (IN) .............................. 201641005108

(51) Int. Cl.
| | | |
|---|---|---|
| *G09B 1/00* | (2006.01) | |
| *G09B 1/10* | (2006.01) | |
| *G09B 5/02* | (2006.01) | |
| *G09B 17/00* | (2006.01) | |

(52) U.S. Cl.
CPC .............. *G09B 1/10* (2013.01); *G09B 5/02* (2013.01); *G09B 17/003* (2013.01)

(58) Field of Classification Search
USPC ....... 434/156, 159, 172, 193, 258, 259, 403, 434/406; 273/157 R
See application file for complete search history.

(56) References Cited

U.S. PATENT DOCUMENTS

| | | | | |
|---|---|---|---|---|
| 3,570,144 A | * | 3/1971 | McNutt .................. | G09B 23/38 273/157 R |
| 4,306,868 A | * | 12/1981 | Hankins ................ | A63F 3/0423 434/159 |
| 4,822,051 A | * | 4/1989 | Nowak ..................... | A63F 9/10 273/157 R |
| 5,087,043 A | * | 2/1992 | Billings .................... | A63F 9/10 273/157 R |
| 5,120,226 A | * | 6/1992 | Tsai ....................... | A63F 3/0415 434/195 |
| 5,653,471 A | * | 8/1997 | Koehn ..................... | B42D 1/00 281/15.1 |
| 5,752,701 A | * | 5/1998 | Kao ..................... | A63F 3/00574 273/153 R |
| 5,980,354 A | * | 11/1999 | Prest ....................... | A63H 33/38 434/171 |

(Continued)

*Primary Examiner* — Kurt Fernstrom
(74) *Attorney, Agent, or Firm* — Blueshift IP, LLC; Robert Plotkin

(57) ABSTRACT

The present invention provides an educational toy simulator which comprises a base member and a set of peg pieces. The base member is formed of multiple layers, and one or more cut outs are formed in the base member for receiving the corresponding peg piece. The cut outs and the peg pieces are formed with a contoured, stepped or tapered structure to prevent the peg pieces from coming in contact with the image display member. A slot is formed in the base member to slidably receive an image display member for displaying a picture through the cut outs. A depth of the peg pieces is smaller than a depth of the corresponding cut outs. Since the image display member is slidably received in the slot, the displayed pictures may be changed from time to time thus providing capabilities for introducing more vocabulary to a learner in a playful way.

14 Claims, 19 Drawing Sheets

(56) References Cited

U.S. PATENT DOCUMENTS

| | | | |
|---|---|---|---|
| 6,146,146 A | 11/2000 | Koby-Olson | |
| 6,626,678 B2* | 9/2003 | Forbes | A63F 9/0666 |
| | | | 273/153 R |
| 6,966,777 B2 | 11/2005 | Robotham | |
| 7,018,213 B2 | 3/2006 | Marcus | |
| 7,828,293 B1* | 11/2010 | Pruzan | A63F 3/00 |
| | | | 273/139 |
| 9,403,084 B2* | 8/2016 | Klemm | A63F 9/10 |
| 2006/0022407 A1* | 2/2006 | Jensen | A63F 3/04 |
| | | | 273/272 |
| 2007/0085269 A1* | 4/2007 | Martin, Jr. | A63F 9/10 |
| | | | 273/157 R |
| 2009/0081624 A1* | 3/2009 | Chien | G09B 1/34 |
| | | | 434/171 |

* cited by examiner

EDUCATIONAL TOY SIMULATOR

DESCRIPTION OF THE INVENTION

Technical Field of the Invention

The present invention relates to an educational toy simulator and a software application thereof for effectively teaching languages to a learner or student while making the learning process more interesting and playful.

Background of the Invention

A new language is generally taught by teaching sounds of letters and groups of letters in a static format and then providing books for practice. For example, English language has 26 alphabets, whereas the standard Hindi language, as agreed by the Government of India, has 11 vowels and 35 consonants, though the traditional Hindi alphabet is considered to be consisting of 13 vowels and 33 consonants while languages such as Vietnamese and Spanish contain 29 letters each and the Greek language contains 24 letters. It does not matter what nationality one is, and every child or adult across the world has to learn alphabets to learn a language. Therefore, it is very important to explore more effective and innovative ways to enhance the alphabet learning process.

Learning the alphabets is an essential part of early learning about literacy. Children appear to acquire alphabetic knowledge in a sequential manner that begins with letter names, then the letter shapes, and finally letter sounds. Thus over a period of time, children learn the order of the letters, phonetic sounds of the letters and various words associated to them. Language could be more effectively taught if students could selectively combine letters and sounds and match various letters and sounds with recognizable pictures. An educational toy simulator allows the children or students to identify the letter in a pegboard with recognizable pictures and formulate various words and groups of letters utilizing all letters and sounds of the alphabet. The educational toy simulator allows the students to efficiently form the words or sounds using groups of letters with a single tool.

Despite its importance, alphabet knowledge often is overlooked as a specific outcome of interest compared with other aspects of literacy instruction such as phonological awareness or reading. An exception is the recent synthesis conducted by the National Early Literacy Panel (NELP), charged with identifying "interventions, parenting activities, and instructional practices that promote the development of early literacy skills" for children from birth till the age of 5. Alphabet knowledge comprises one of the emergent literacy skill outcomes investigated by the Panel. Children's knowledge of letter names and sounds is the best predictor of their later reading and spelling abilities preschool and kindergarten students with poor knowledge of letter names and sounds are more likely to struggle with learning to read and be classified as having reading disabilities (Gallagher, Frith, & Snowling, 2000; O'Connor & Jenkins, 1999; Torppa, Poikkeus, Laakso, Eklund, & Lyytinen, 2006). These children tend to fall further behind their peers in reading acquisition, leading to gaps in spelling, reading fluency, vocabulary, and comprehension skills (Stanovich, 1986; Torgesen, 2002). For these reasons, alphabet knowledge has become an important learning goal for young children.

Despite these initiatives, relatively little is known about the impact of early instructions on the development of alphabet knowledge. This fact is especially troublesome as large numbers of children continue to enter kindergarten knowing less than half of the letter names and fewer letter sounds (U.S. Department of Health and Human Services & Administration for Children and Families, 2005, 2006). Approaches to alphabet teaching vary greatly, as there has been disagreement about the appropriateness of early literacy instruction and about what constitutes effective instruction (Bredekamp, 1987; Dickinson, 2002; Elkind & Whitehurst, 2001; Foulin, 2005; Justice, Pence, Bowles, & Wiggins, 2006).

Children's reading development is dependent on their understanding of the alphabetic principle—the idea that letters and letter patterns represent the sounds of spoken language. Learning that there are predictable relationships between sounds and letters allows children to apply these relationships to both familiar and unfamiliar words, and to begin to read with fluency.

From the above observations, it is clearly established that the present day alphabet books have a major drawback; as many a times, these books are not localized to the child's immediate surroundings. As discovered in the use of mnemonic devices, it is observed that pictures do help children learn letter-sound correspondences; hence incorporating the letter-shape into the picture is also beneficial. Recognition of letters can be taught by encouraging children to distinguish shapes and case by manipulating magnetic letters, reading labels, recognizing familiar names, and distinguishing one letter character from another by special features. There are various kinds of alphabet puzzles, in which each letter is a puzzle piece, a kind of 3D letter that allows the child to feel the curves and lines of the letters. Such puzzle pieces can be made from plastic, magnetic, tile, or wooden letters available for children to manipulate, feel and experience.

Various types of conventional educational toy systems to educate the children are known in the prior art. The U.S. Pat. No. 7,018,213 describes an electronic educational toy for teaching letters, words, numbers and pictures. The cited document describes an electronic educational toy having a housing for teaching letters, words, numbers or pictures comprising a toy housing supporting a substantially planar work platform on which a child can make selections by causing contact with the work platform and enclosing a speaker, a processor, and a sensing system sensing occurrences of contact caused by the child across the surface of the work platform.

The U.S. Pat. No. 6,966,777 describes a tool device, system and method for teaching reading. The cited document describes a book-like reading teaching tool having a plurality of columns, wherein each column contains each letter of the alphabets in ascending format, which are simultaneously viewable, a picture corresponding to each sound of each letter in the alphabet and structure for interchanging, mixing and matching letters and identifying and selecting long vowel and short vowel sounds. The reading tool includes a front cover, back cover, spiral binder, instructions, alphabet indicia, plurality of pictures corresponding to each letter and sound in the alphabet, plurality of windows or cut outs corresponding to selected letters and sounds, short vowel sound indicia, long vowel sound indicia and plurality of flip panels arranged in columns wherein each panel in each column contains a letter indicia. The covers, pages and panels have a plurality of apertures that are joined at coinciding ends by the spiral binder. The windows are formed in the second page over pictures corresponding to letters having only one sound or one common sound, such as the letter "B". The instructions indicate how to form words and sounds using the panels and also include suggested beginning sounds, set of suggested complex beginning sounds, set of suggested ending sounds and set of suggested complex ending sounds.

The U.S. Pat. No. 6,146,146 describes a learning device for children. The cited document describes an interactive learning device for children that includes a housing with a front and back face. Multiple switches are located on the front face of the housing and an image of a letter of an alphabet is associated with each of the switches. The housing also supports a speaker designed to produce sounds or music and one or more display devices for displaying images. An electronic processor in the housing communicates electrically with the multiple switches, the speaker, and the one or more display screens. The processor responds to the switches to selectively cause the speaker to produce sounds and the screen to display images.

However, there is no device available so far that can vary the images or pictures displayed for the chosen letter or alphabet to keep the interest of the child while learning a new language as repetition of the same set of images can make a child feel bored after sometime.

Hence, there is need for a device that allows varying images or pictures displayed for the chosen letter or alphabet, which leads to effective teaching of the language to a learner without making them feel bored. Furthermore, there is need for a simulator capable of providing ability to introduce newer words and images periodically and to maintain and track the learning steps of the learners.

SUMMARY OF THE INVENTION

The present invention eliminates the drawbacks of the prior arts by providing an educational toy simulator which comprises a base member and a set of peg pieces. The base member is formed of multiple layers, and one or more cut outs are formed in the base member for receiving the corresponding peg piece. A slot is formed in the base member to slidably receive an image display member for displaying a picture through the cut outs. A depth of each peg piece is smaller than a depth of the corresponding cut out.

Each peg piece and the corresponding cut out are formed as an alphabet, and the picture displayed through the cut out is associated with the alphabet. For example, if the peg piece and the cut out are shaped as alphabet "A", then the picture shows an apple, ant or any other figure which may be associated with "A".

Since the image display member is slidably received in the slot, the picture associated with the alphabet may be changed from time to time thus providing capabilities for introducing more vocabulary to the child in a playful way.

In one embodiment, the image display member is a panel with a picture on a top surface of the panel, wherein the picture may be changed by gluing or replacing with a sheet of another picture over the old sheet.

In another embodiment, the image display member is an electronic display device such as a tablet computer, personal digital assistant (PDA) or any other display device that may be inserted into the slot. The display device may include a software application that can automatically change the old picture with a new picture selected from a set of pictures stored in a storage unit of the display device. The display device may also be connected to a cloud server to download pictures to be stored and/or displayed. Furthermore, the display device includes an audio device such as speakers, for providing audible instructions to a learner.

In another embodiment, the image display member is a transparent casing that can enclose a sheet of picture, wherein the picture may be changed by opening the casing and replacing a new picture.

The cut out is shaped to hold the peg piece above the image display member, such that a gap is formed between a bottom surface of the peg piece and the image display member. Because of the gap x, a contact between the image display member and the peg piece is avoided, and thus the image display member is protected from potential damage. Moreover, the cloud connected image display member allows analyzing and tracking a development of alphabet knowledge of the learner, and assigning different images based on the development.

It is to be understood that both the foregoing general description and the following detailed description are exemplary and explanatory and are intended to provide further explanation of the invention as claimed.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The present invention eliminates all the drawbacks of the prior arts by providing an educational toy simulator comprising a base member and a set of peg pieces. The base member is formed of multiple layers, and one or more cut outs are formed in the base member for receiving the corresponding peg piece. A slot is formed in the base member to slidably receive an image display member for displaying a picture through the cut outs. A depth of each peg piece is smaller than the depth of the corresponding cut out.

The bottom most layer of the base member functions as a substrate to support the entire device. The layer above the bottom most layer is cut to form the slot, while the two top layers are cut to form the cut outs. The cut outs and the peg pieces are shaped appropriately, such that a top surface of each peg piece is in line with a top surface of the base member. The cut outs and the peg pieces are formed with a contoured, stepped or tapered structure to prevent the peg pieces from coming in contact with the image display member. By this way, the image display member is protected from getting damaged due to frequent contact of the peg pieces.

The slot is shaped to receive the image display member that is in the form of a printed sheet of paper, electronic display or transparent case. This allows the picture associated with the alphabet to be changed from time to time thus providing capabilities for introducing more vocabulary to the child in a playful way.

Figure 1:
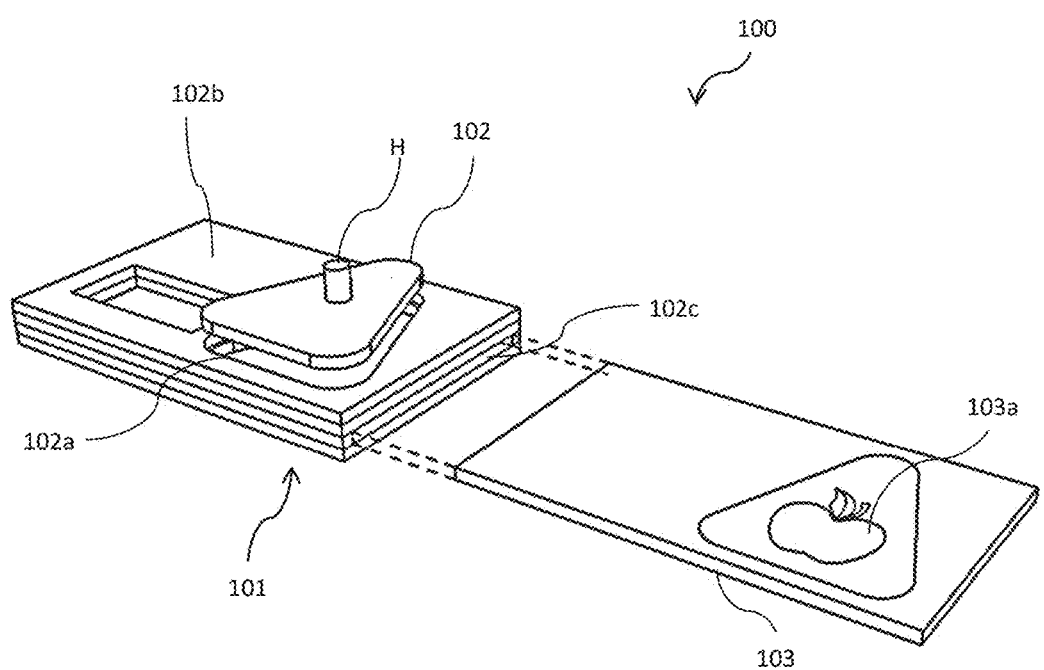
FIG. 1 shows the exploded perspective view of the educational toy simulator in accordance with the first embodiment of the present invention.

FIG. 1 shows the exploded perspective view of the educational toy simulator in accordance with the first embodiment of the present invention. The simulator 100 includes a base member 101, a peg piece 102 and an image display member 103. The peg piece 102 is shaped to look like an alphabet, for example "A" as in FIG. 1, and also fitted with a pin H for lifting the peg piece 102. The base member 101 may preferably be formed of a rigid material like wood, plastic etc., and includes a cut out 102a formed on the front face 102b of the base member. The cut out 102a is shaped to receive the peg piece 102, such that the peg piece 102 exactly fits into the cut out 102a.

Figure 2:
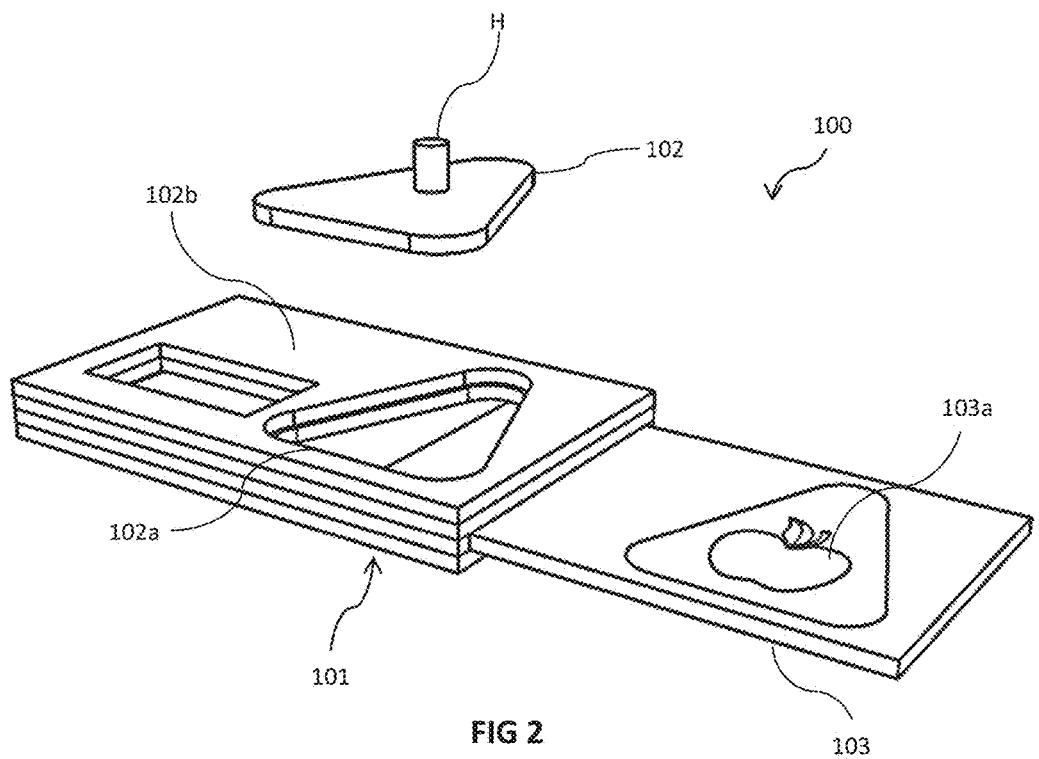
FIG. 2 shows the exploded perspective view of the educational toy simulator with the image display member partially slid into the slot provided on base member in accordance with the first embodiment of the present invention.
Figure 3:
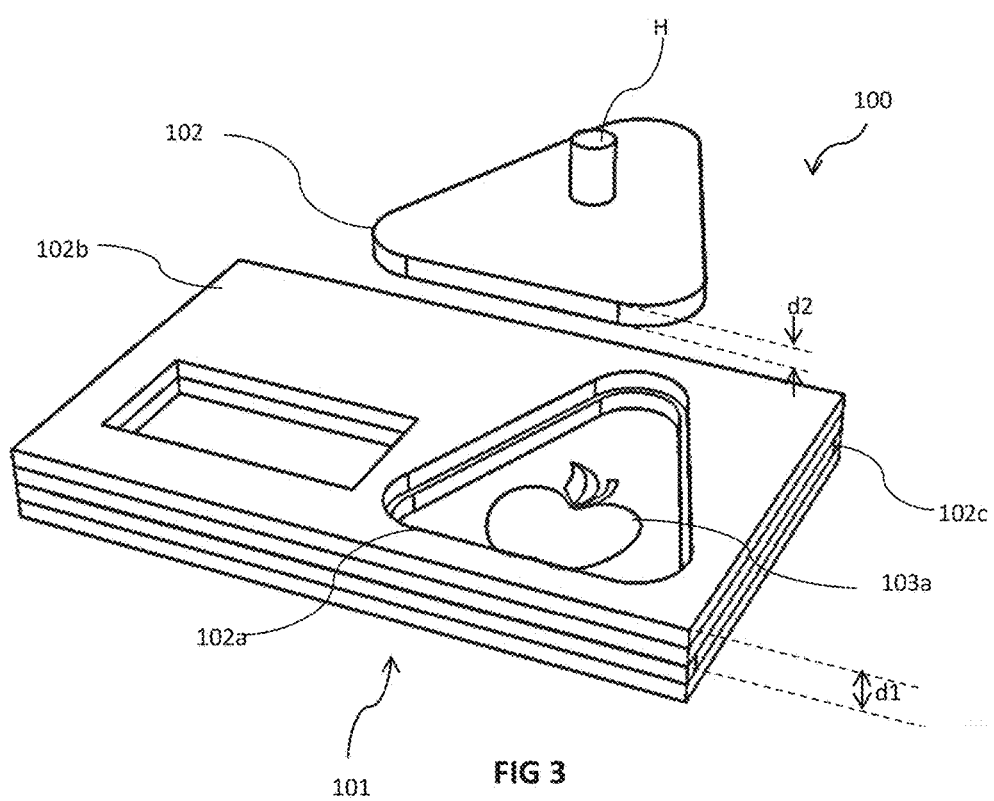
FIG. 3 shows the exploded perspective view of the educational toy simulator with the image display member completely slid into the slot provided on the base member in accordance with the first embodiment of the present invention.

The base member 101 is formed of four layers 101a-101d, wherein the bottom-most layer 101d functions as a substrate or supporting all the other components. A depth of the peg piece 102 is equal to that of the topmost layer 101a, so that a top surface of the peg piece 102 is in level with the front face 102b. The cut out 102a is formed in the two top layers 101a & 101b to look like a contoured structure, such that the peg piece 102 is held in the contoured structure and stopped from touching the image display member 103. The base member 101 also includes a slot 102c formed in the third layer 101c in a shape that complies with the cross section of the image display member 103 for receiving the image display member 103 as shown in FIG. 2. When the image display member 103 is completely slid into the base member 101 as shown in FIG. 3, an image 103a formed on the image display member 103 is seen through the corresponding cut out 102a.

Figure 4:
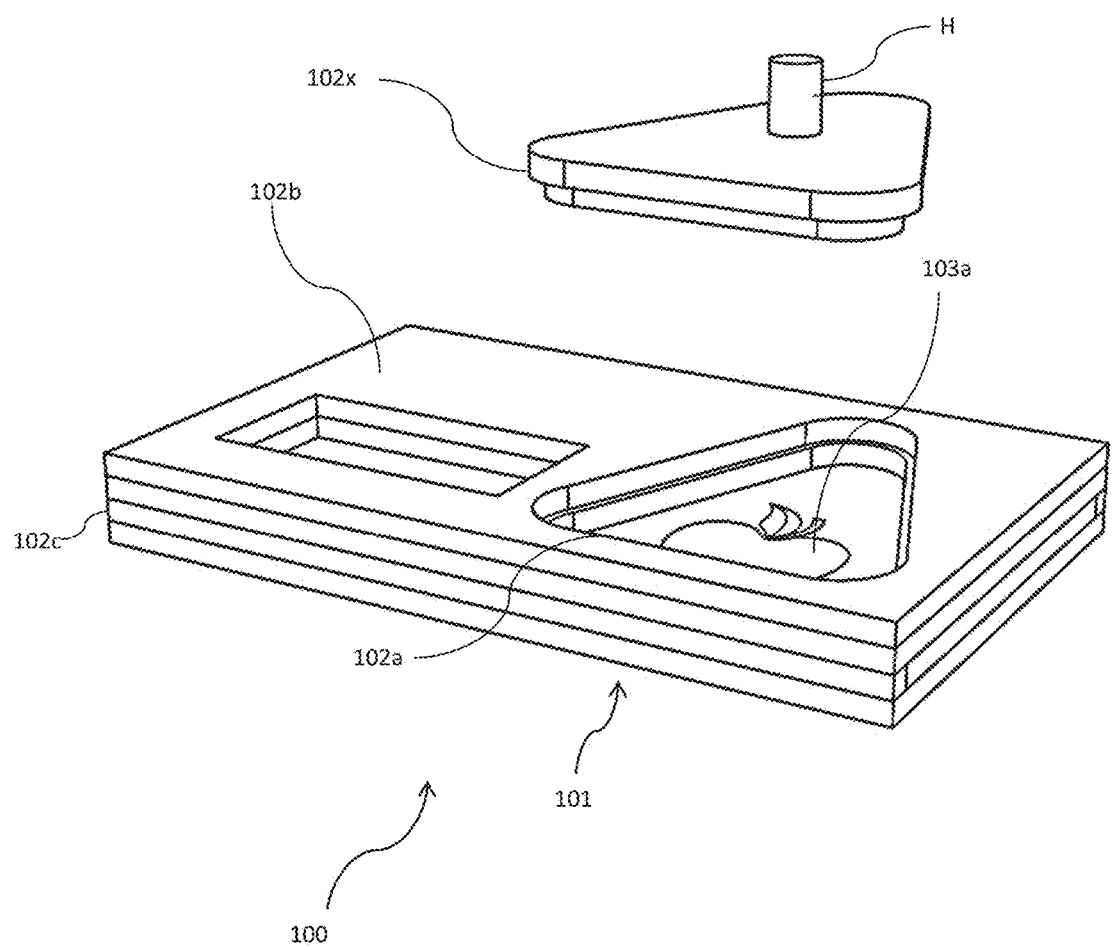
FIG. 4 shows the exploded perspective view of the educational toy simulator with the image display member completely slid into the slot provided on the base member in accordance with the second embodiment of the present invention.
Figure 5:
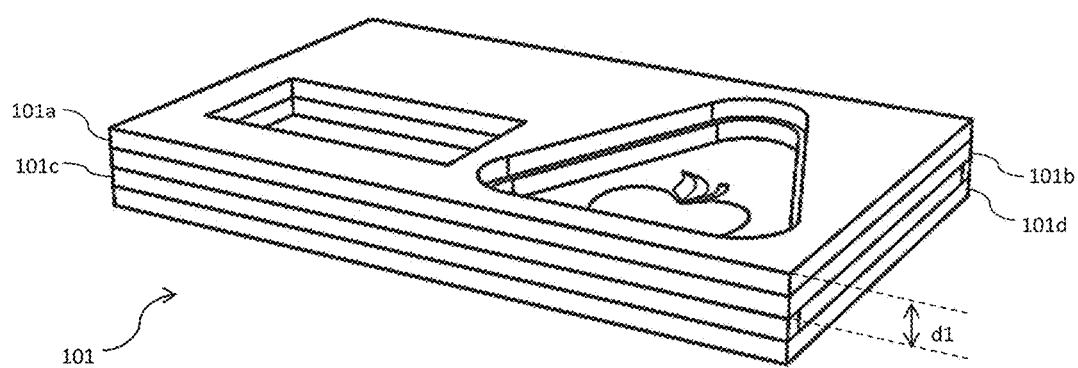
FIG. 5 shows the perspective view of the base member with the image display member completely slid into the slot provided on the base member in accordance with the second embodiment of the present invention.
Figure 6:
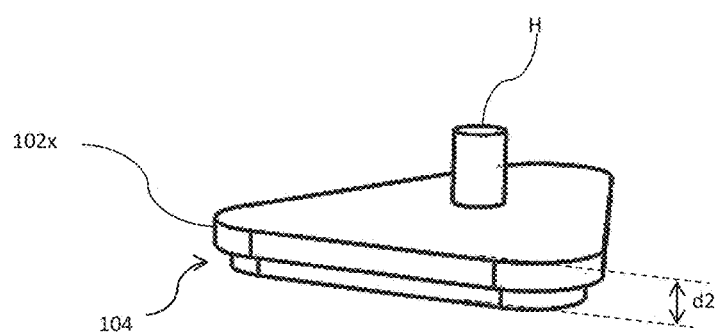
FIG. 6 shows the perspective view of the peg piece in accordance with the second embodiment of the present invention.

FIG. 4 shows the exploded perspective view of the educational toy simulator with the image display member completely slid into the base member in accordance with the second embodiment of the present invention. In this embodiment, the peg piece 102x is formed with a contoured structure 104, as shown in FIG. 6, that matches with the contoured structure of the cut out 102a, as shown in FIG. 5. Furthermore, a depth "d2" of the peg piece 102x is made to be equal to or less than a combined depth "d1" of the top two layers 101a & 101b, thus preventing the peg piece 102x from touching the image display member 103.

Figure 7:
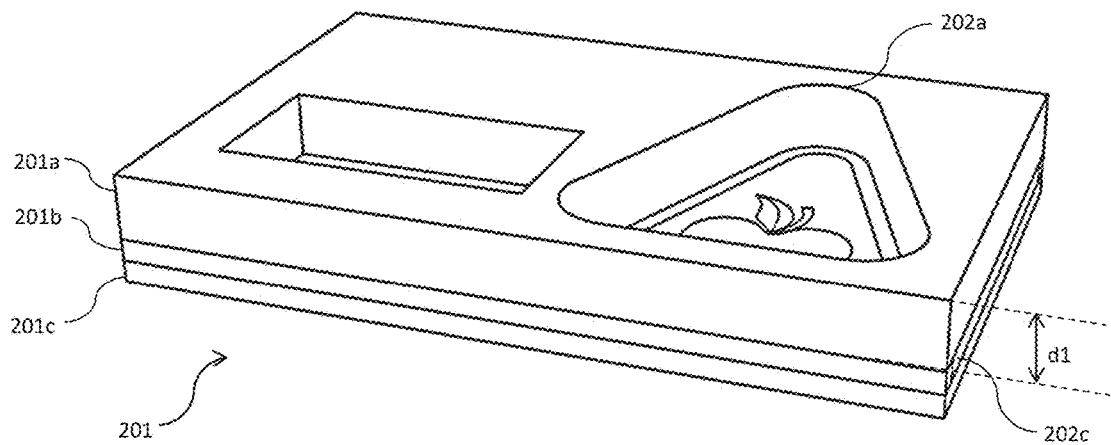
FIG. 7 shows the perspective view of the base member with the image display member completely slid into the slot provided on the base member in accordance with the third embodiment of the present invention.
Figure 8:
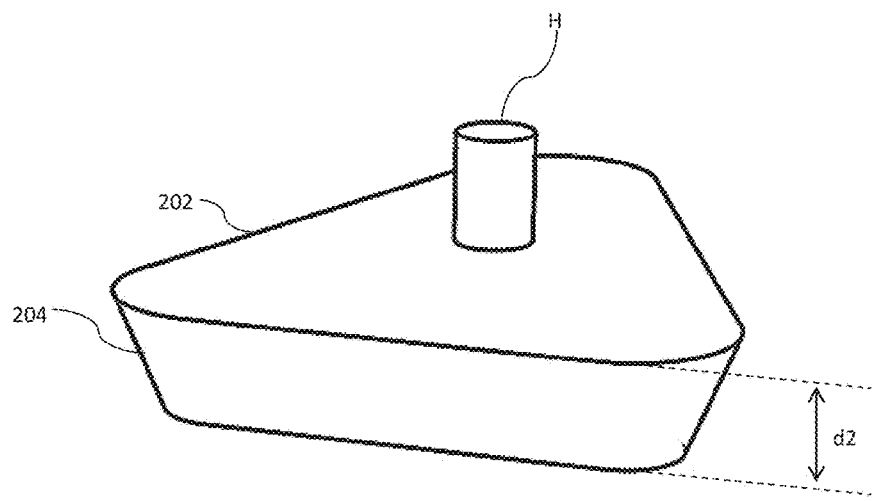
FIG. 8 shows the perspective view of the peg piece in accordance with the third embodiment of the present invention.
Figure 9:
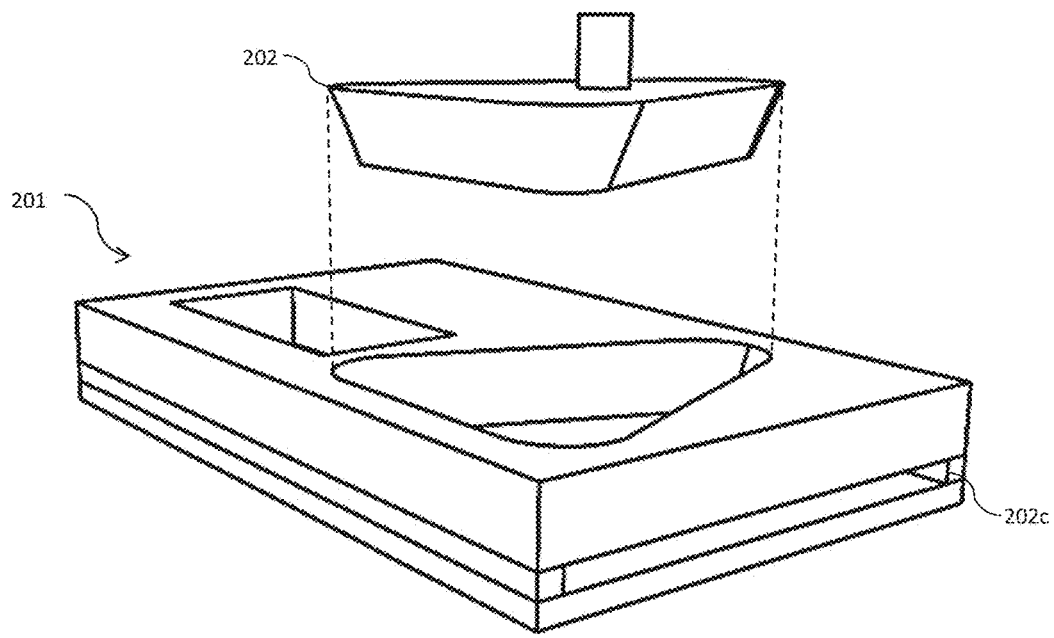
FIG. 9 shows the perspective view of the base member with the slot provided and the peg piece in accordance with the third embodiment of the present invention.
Figure 10:
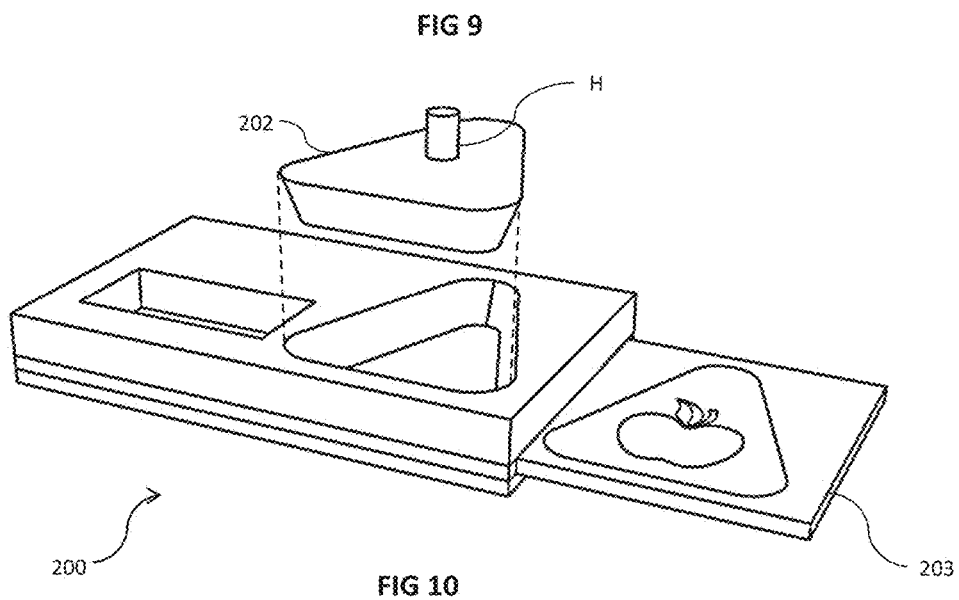
FIG. 10 shows the exploded perspective view of the educational toy simulator with the image display member partially slid into the slot provided on the base member in accordance with the third embodiment of the present invention.
Figure 11:
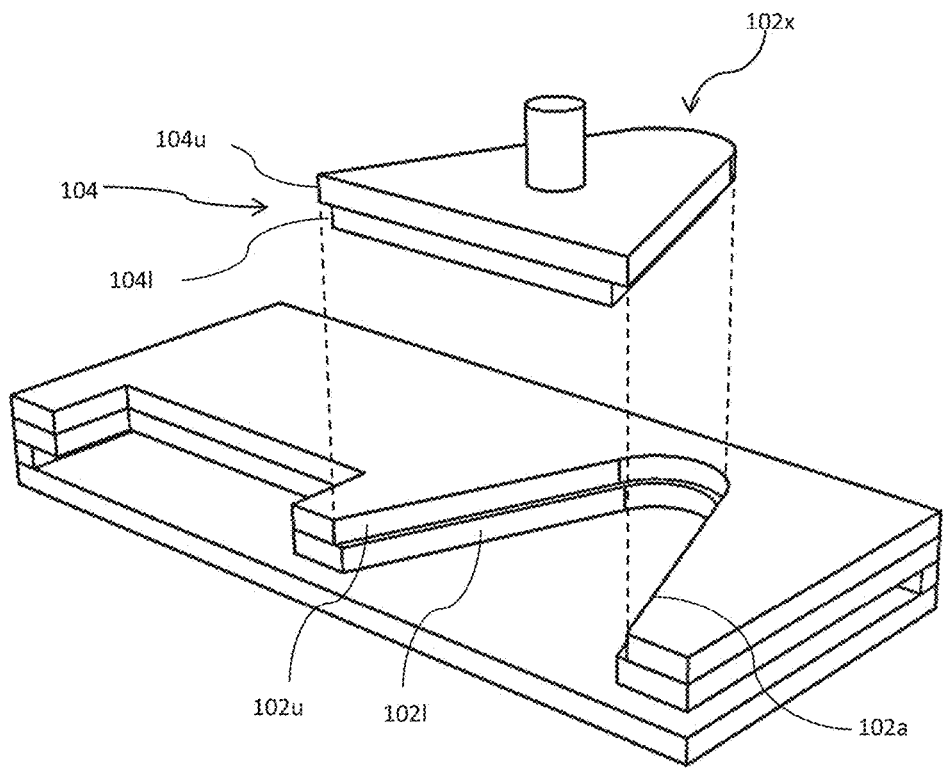
FIG. 11 shows the cut-away top perspective view of the base member and the peg piece in accordance with the second embodiment of the present invention.
Figure 12:
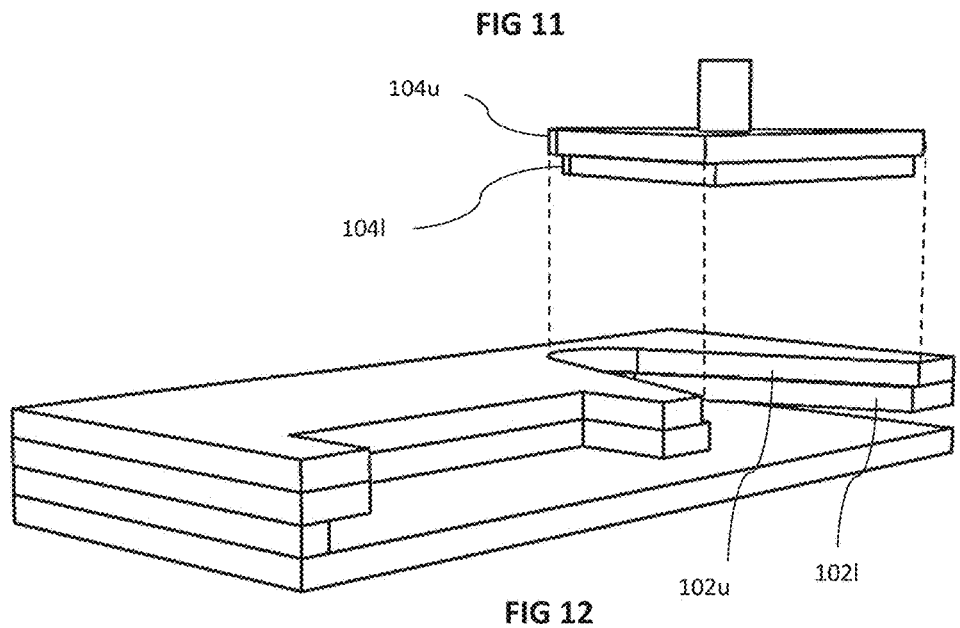
FIG. 12 shows the cut-away side perspective view of the base member and the peg piece in accordance with the second embodiment of the present invention.
Figure 13:
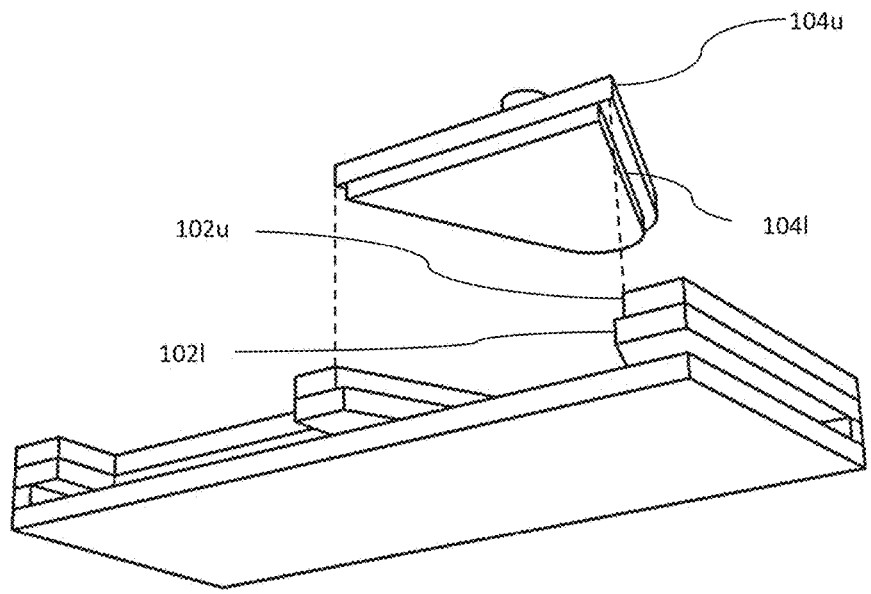
FIG. 13 shows the cut-away bottom perspective view of the base member and the peg piece in accordance with the second embodiment of the present invention.
Figure 14:
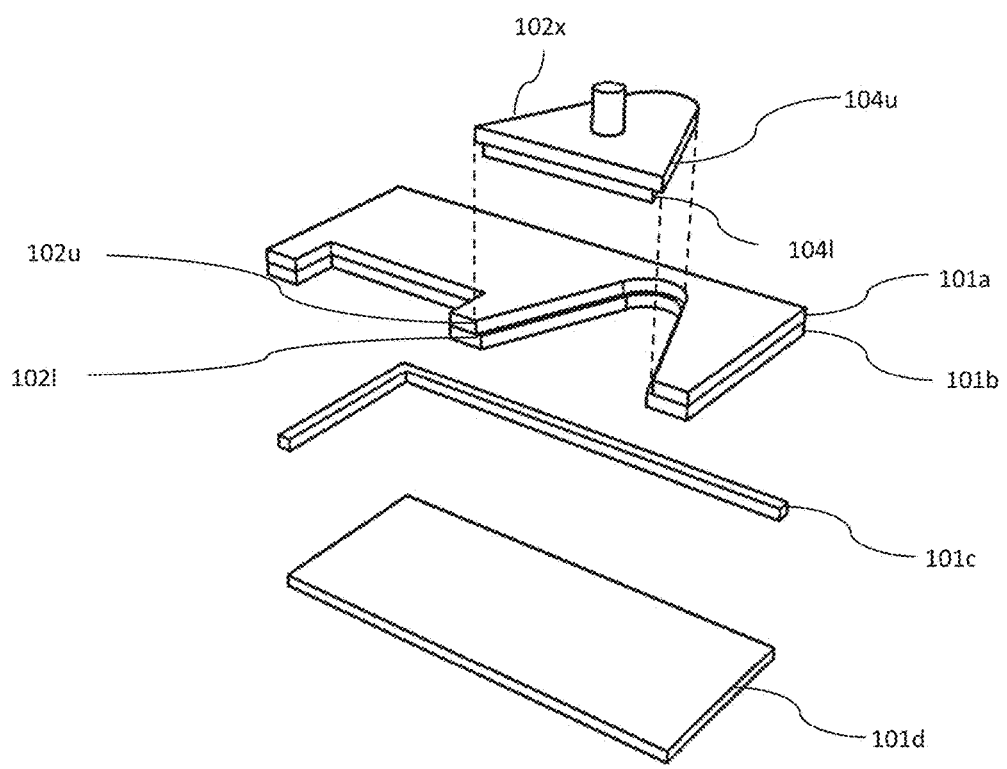
FIG. 14 shows the cut-away exploded perspective view of the base member and the peg piece in accordance with the second embodiment of the present invention.

FIG. 7 shows the perspective view of the base member with the image display member completely slid into the base member in accordance with the third embodiment of the present invention. The base member 201 is formed of three layers 201a-201c, wherein the cut out 202a is formed in the topmost layer 201a. The cut out 202a is formed with a tapered structure, such that the wider part is on the upper side of the topmost layer 201a and the lower part is on the lower side of the topmost layer 201a. The peg piece 202 is also formed with a tapered structure 204, as shown in FIG. 8, that matches with that of the cut out 202a. A depth "d2" of the peg piece 202 is made to be equal to or smaller than a depth "d2" of the topmost layer 201a, in order to prevent the peg piece 202 from touching the image display member 203. The lower most layer 201c functions as a substrate to support the entire simulator 200. The slot 202c is formed in the middle layer 201b as shown in FIG. 9, through which the image display member 203 can be slid into the base member 201 as shown in FIG. 10.

The construction of the contoured structures of the peg piece 102x and cut out 102a are shown in the FIGS. 11-14. The contoured structure 104 of the peg piece 102x includes an upper part 104u and a lower part 104l, wherein a width of the upper part 104u is greater than that of the lower part 104l. Similarly, the contoured structure of the cut out 102a includes an upper cut out part 102u and a lower cut out part 102l, wherein a width of the upper cut out part 102u is smaller than that of the lower cut out part 102l. The width difference of the upper part 104u and the lower part 104l is less than or equal to the width different of the upper cut out part 102u and the lower cut out part 102l. By this way, when the peg piece 102x is inserted into the cut out 102a, the upper part 104u rests on top of the lower cut out part 102l, and so the top surface of the peg piece 102x is in level with the front face 102b. In another embodiment, the visible upper edge surface of the lower cut out part 102l is colored to provide a thick edged highlight while viewing an image on the image display member completely slid into the base member.

Figure 15:
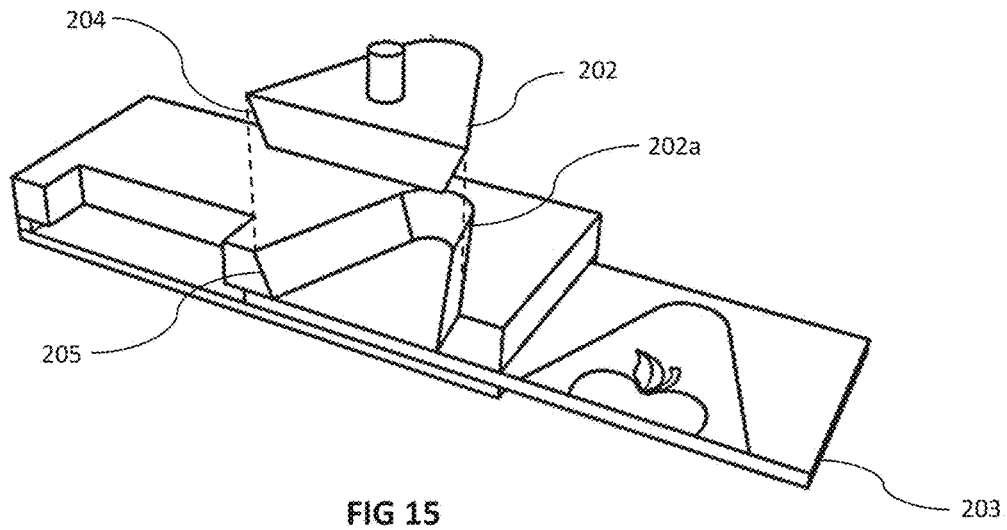
FIG. 15 shows the cut-away exploded perspective view of the educational toy simulator with the image display member partially slid into the slot provided on the base member in accordance with the third embodiment of the present invention.
Figure 16:
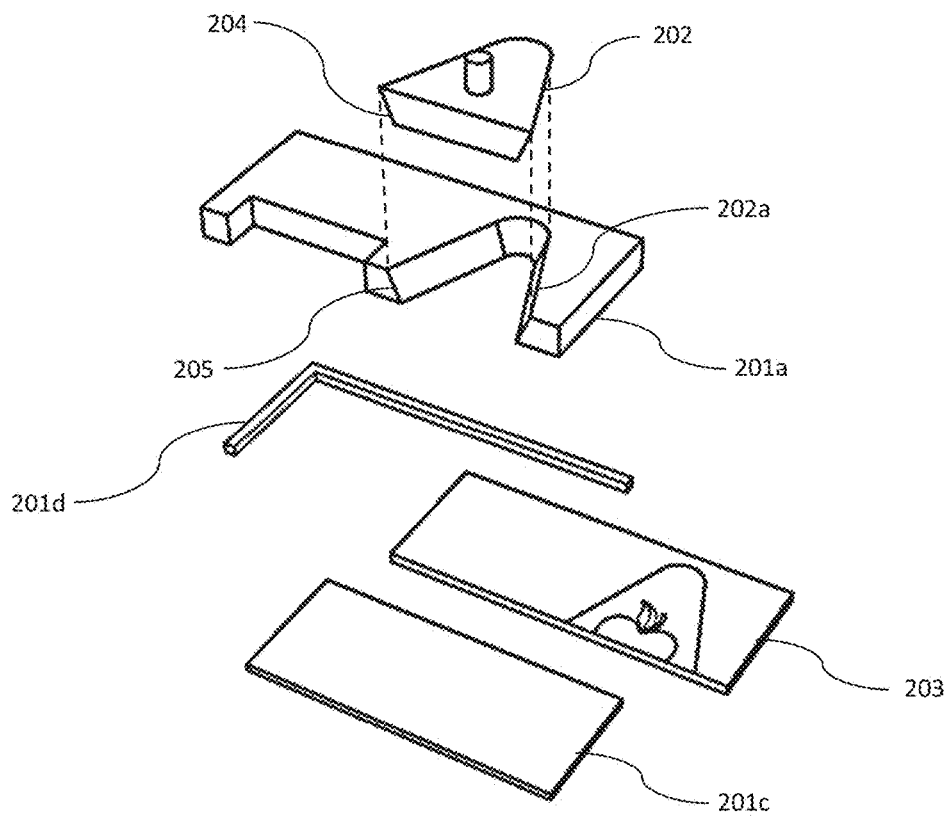
FIG. 16 shows the cut-away exploded perspective view of the educational toy simulator in accordance with the third embodiment of the present invention.
Figure 17:
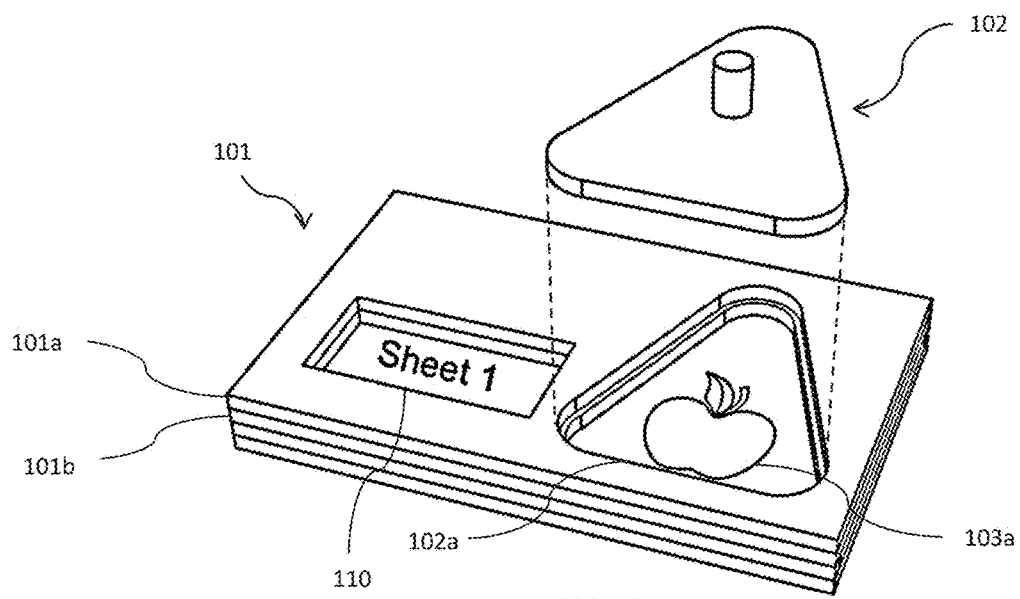
FIG. 17 shows the exploded perspective view of the educational toy simulator in accordance with the first embodiment of the present invention.
Figure 18:
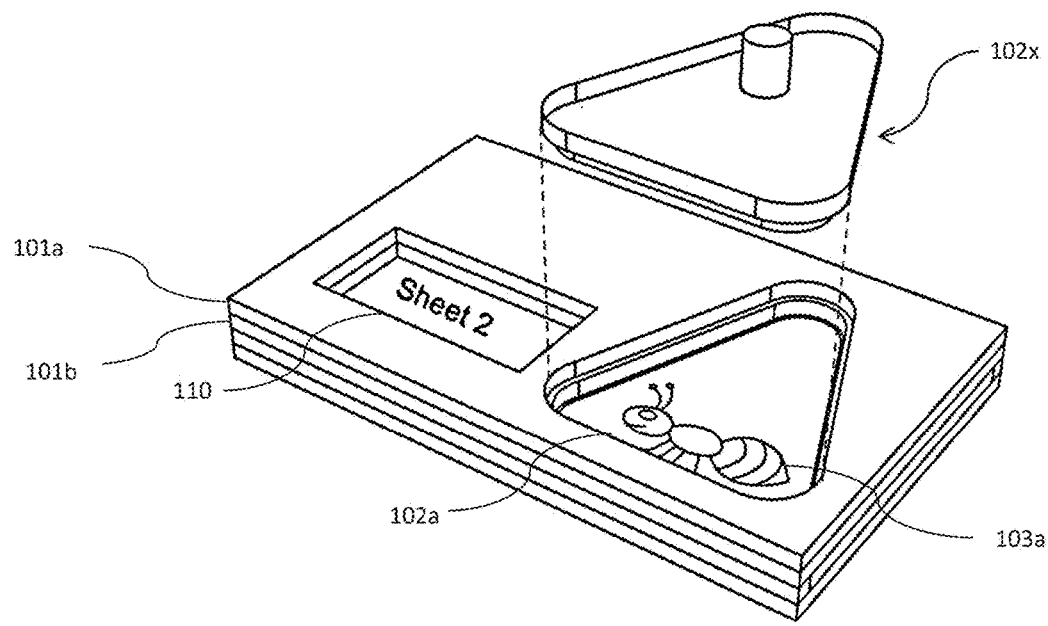
FIG. 18 shows the exploded perspective view of the educational toy simulator in accordance with the second embodiment of the present invention.

The construction of the tapered structures 204, 205 of the peg piece 202 and the cut out 202a are shown in the FIGS. 15 & 16. The base member 101 further includes an opening 110 in the top two layers 101a, 101b as shown in FIGS. 17 & 18. A reference number of the image display member 103 can be seen through the opening 110. For example, the image display member 103 is referenced as "Sheet 1" in FIG. 17, whereas FIG. 18 shows another image display member 103 with the reference number "Sheet 2" inserted into the base member 101. The English alphabet "A" is assigned with an image of an apple in Sheet 1, while the same is assigned with an image of an ant in Sheet 2. This allows a trainer to maintain and track the learning steps of a learner and analyze the development in vocabulary knowledge of the learner. In another embodiment, the opening 110 can be closed with a covering member formed of a transparent material like plastic, glass and the like.

Figure 19:
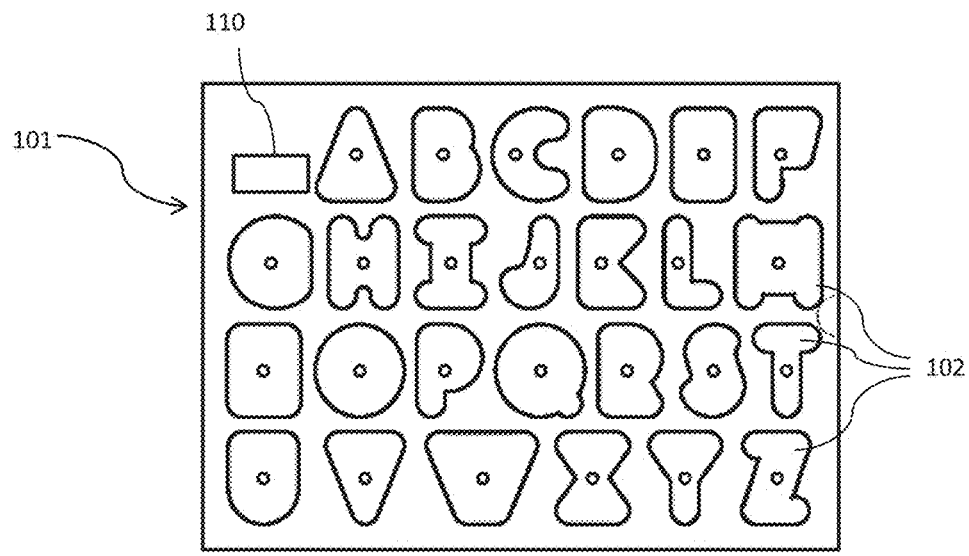
FIG. 19 shows the front view of the educational toy simulator in accordance with the first embodiment of the present invention.
Figure 20:
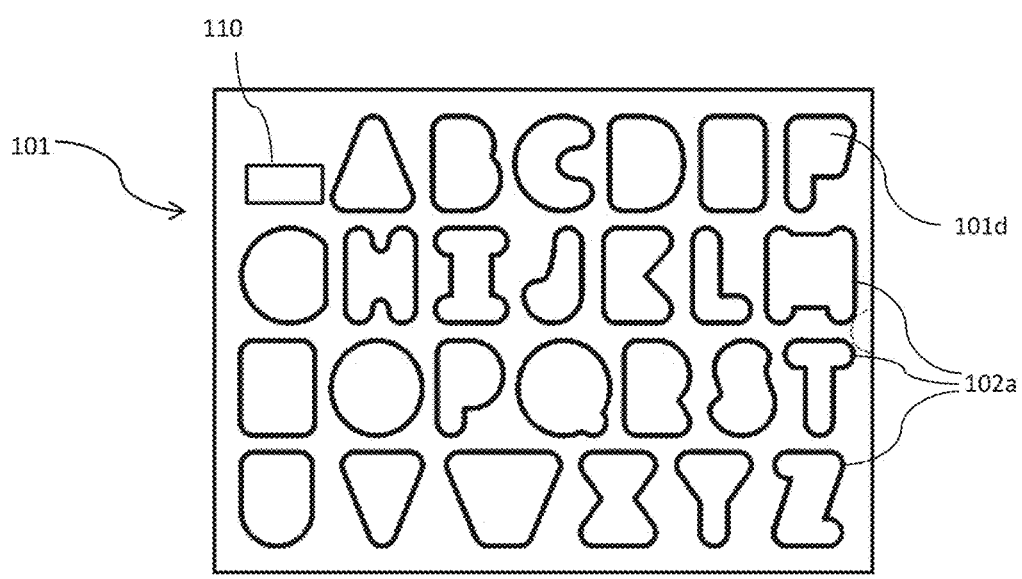
FIG. 20 shows the front view of the base member in accordance with the first embodiment of the present invention.
Figure 21:
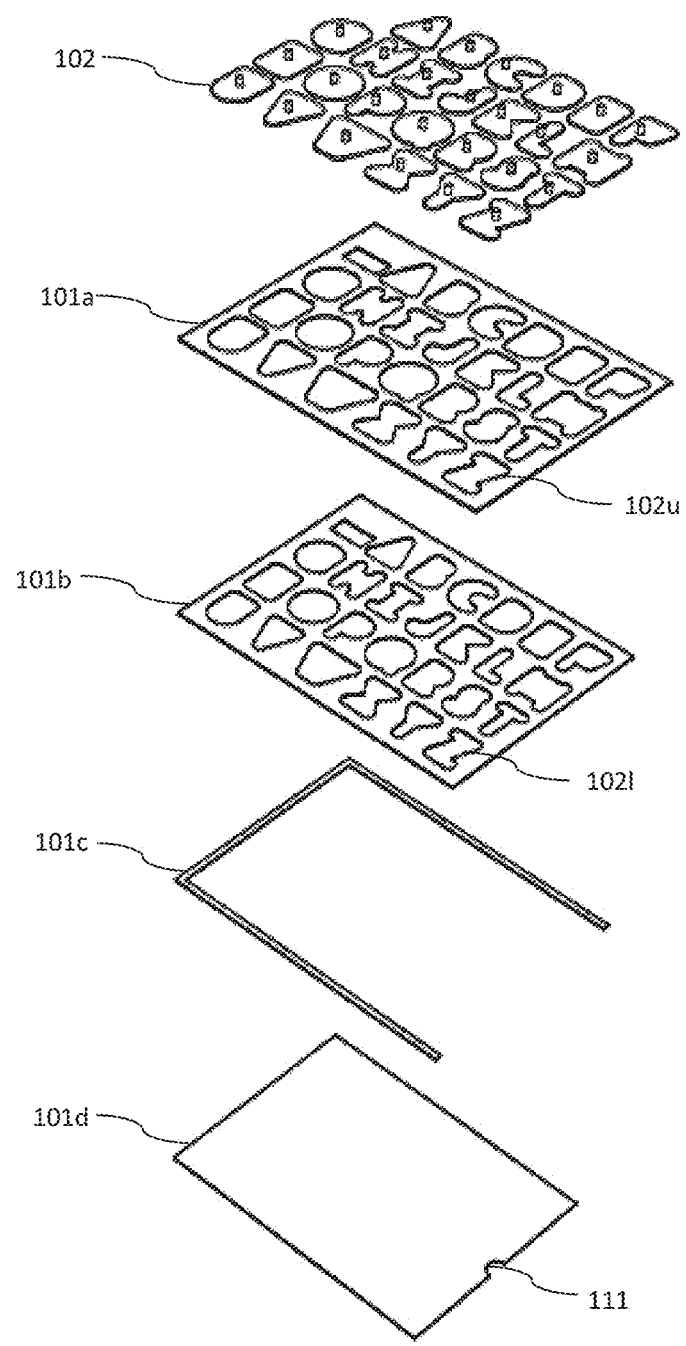
FIG. 21 shows the exploded perspective view of the educational toy simulator in accordance with the first embodiment of the present invention.
Figure 22:
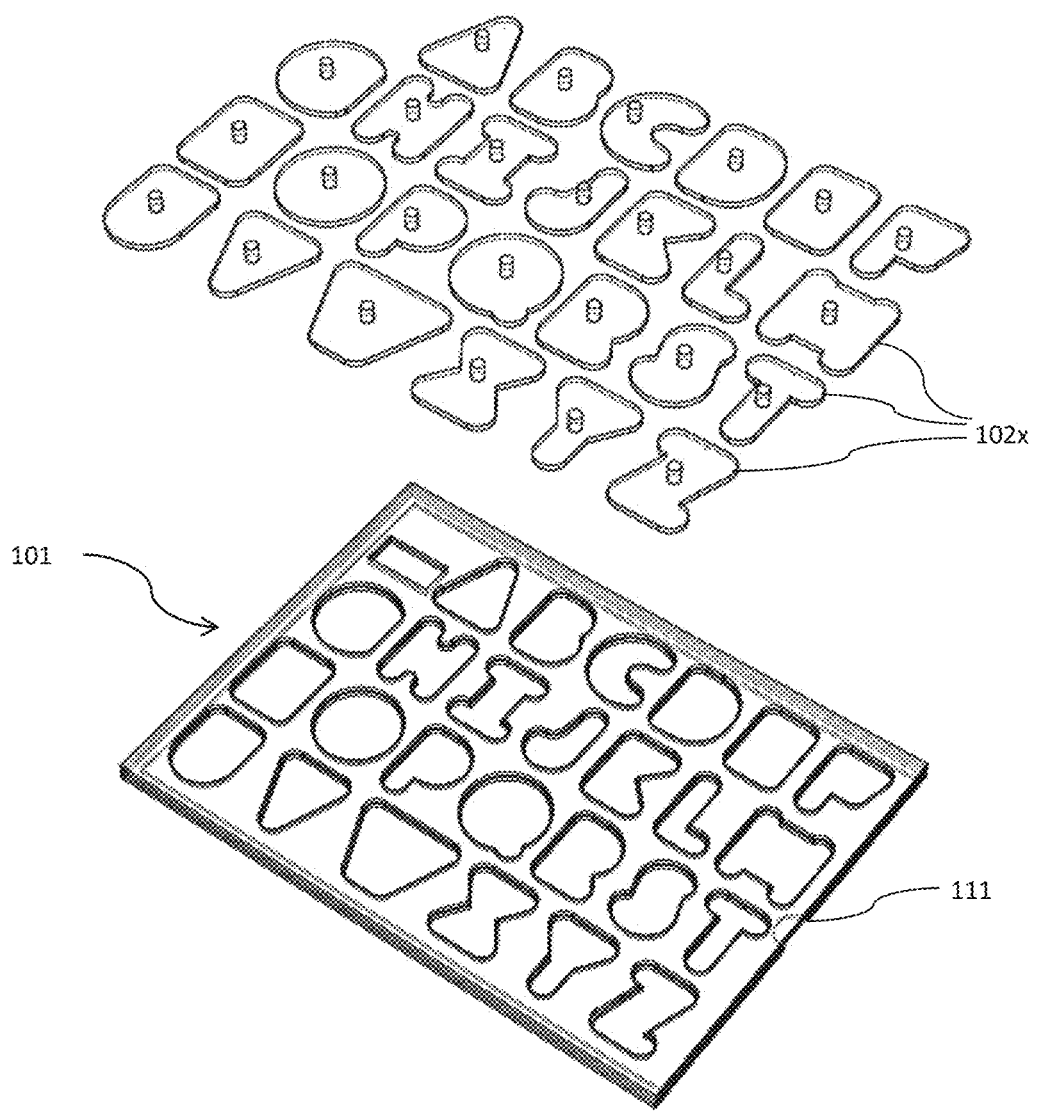
FIG. 22 shows the perspective view of the base member and the peg pieces in accordance with the first embodiment of the present invention.

FIG. 19 shows the front view of the simulator in accordance with the first embodiment of the present invention wherein all the peg pieces 102 are shown as placed on the base member 101. FIG. 20 shows the front view of the simulator in accordance with the first embodiment of the present invention. When the peg pieces 102 are removed from the cut outs 102a, the bottom most layer 101d of the base member is visible through the cut outs 102a. A notch 111 is formed in the bottom most layer 101d of the base member 101 as shown in FIG. 21. The notch 111 helps in holding the image display member 103 while pulling the image display member 103 out of the base member 101. FIG. 22 shows the exploded perspective view of the base member and the peg pieces in accordance with the second embodiment of the present invention.

Figure 23:
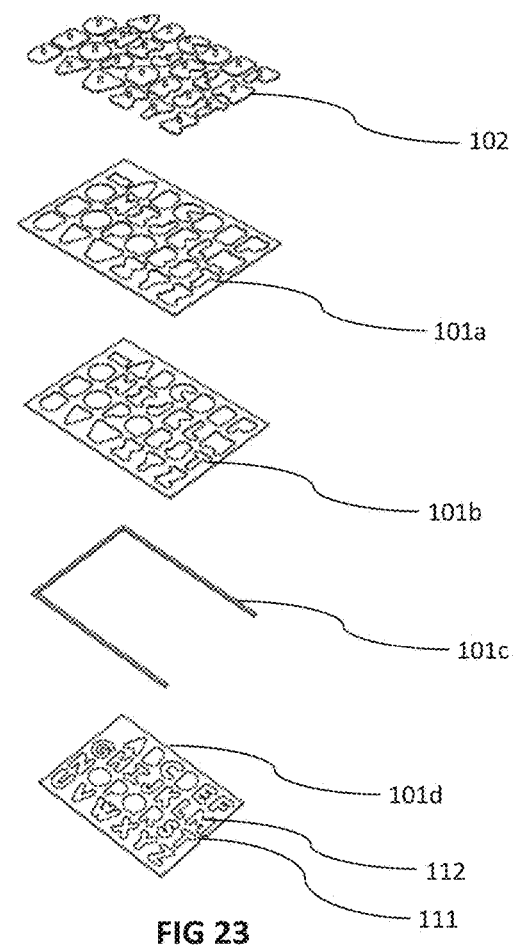
FIG. 23 shows the exploded perspective view of the educational toy simulator in accordance with the fourth embodiment of the present invention.
Figure 24:
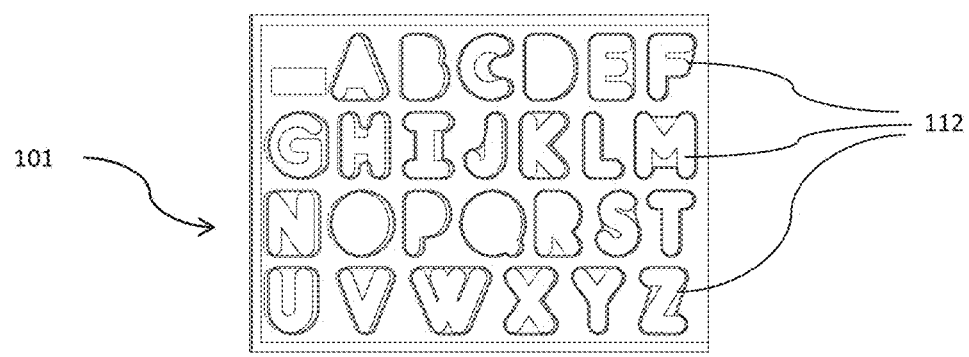
FIG. 24 shows the front view of the base member in accordance with the fourth embodiment of the present invention.

FIG. 23 shows the exploded perspective view of the base member and the peg pieces in accordance with the fourth embodiment of the present invention. The bottom most layer 101d of the base member 101 is etched with alphabets 112, so that beginners may able to correlate the alphabets with the corresponding peg pieces 102. When the image display member 103 is removed from the base member 101, the etched alphabets 112 are visible through the cut outs 102a as shown in FIG. 24.

Figure 25:
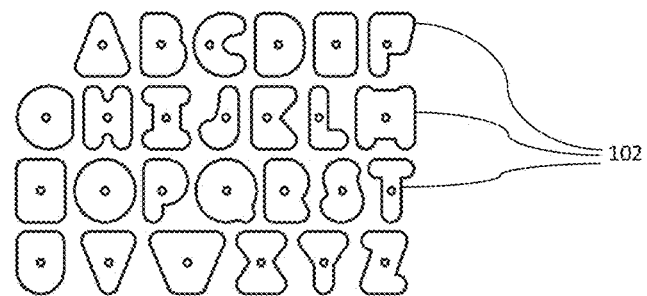
FIG. 25 shows the front view of the peg pieces in accordance with the first embodiment of the present invention.
Figure 26:
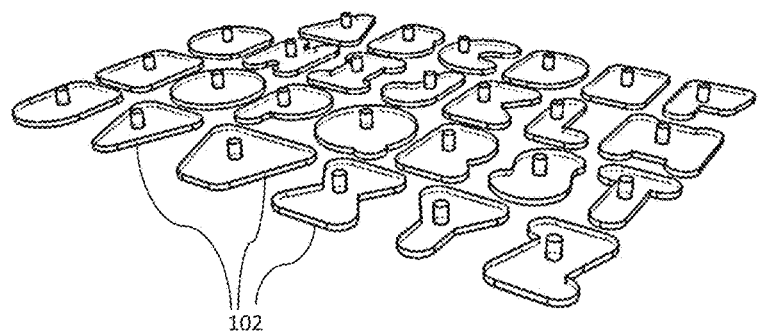
FIG. 26 shows the perspective view of the peg pieces in accordance with the first embodiment of the present invention.
Figure 27:
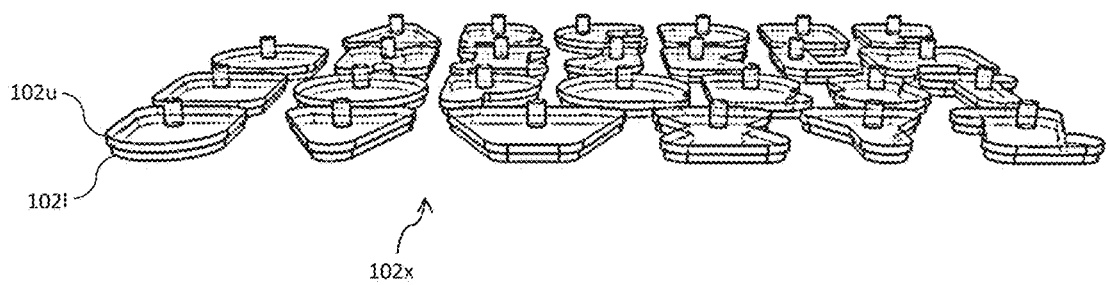
FIG. 27 shows the front perspective view of the peg pieces in accordance with the second embodiment of the present invention.
Figure 28:
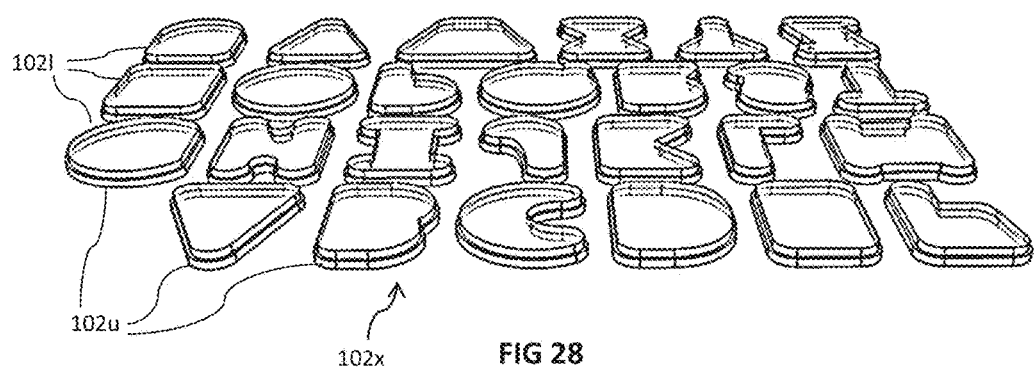
FIG. 28 shows the bottom perspective view of the peg pieces in accordance with the second embodiment of the present invention.

FIG. 25 shows the front view of the peg pieces in accordance with the first embodiment of the present invention. The peg pieces 102 are formed of a wood or soft material such as plastic, rubber and the like, in the shape of alphabets with a single layer as shown in FIG. 26. In the second embodiment, as shown in FIGS. 27 & 28, the peg pieces 102x include two layers with the upper part 102u and the lower part 102l which when combined or glued together form the alphabet peg with the contoured structure 104.

Figure 29:
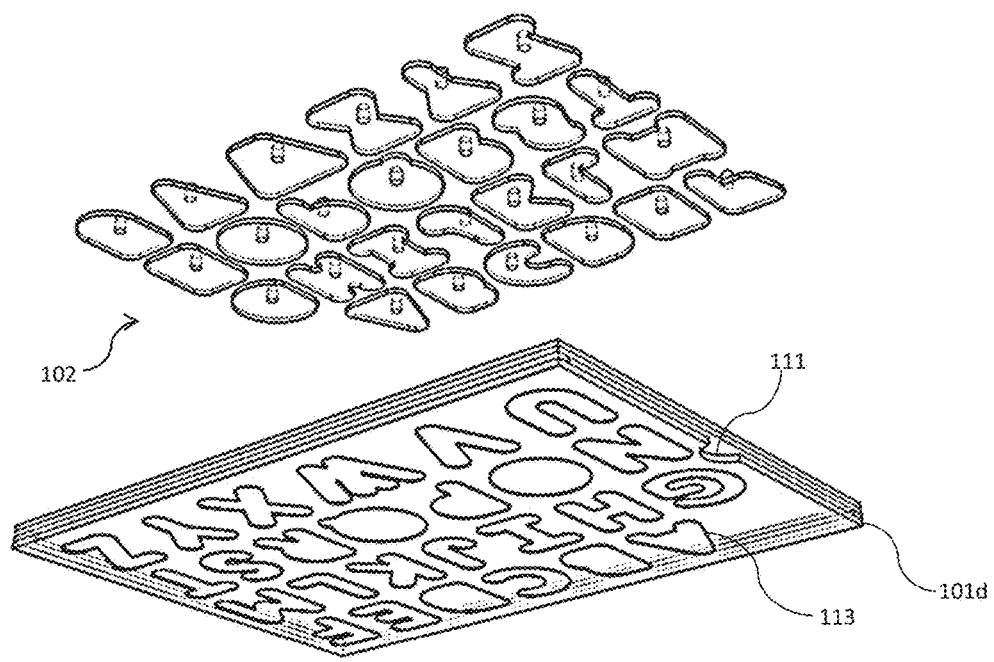
FIG. 29 shows the bottom perspective view of the base member and the peg pieces in accordance with the fifth embodiment of the present invention.
Figure 30:
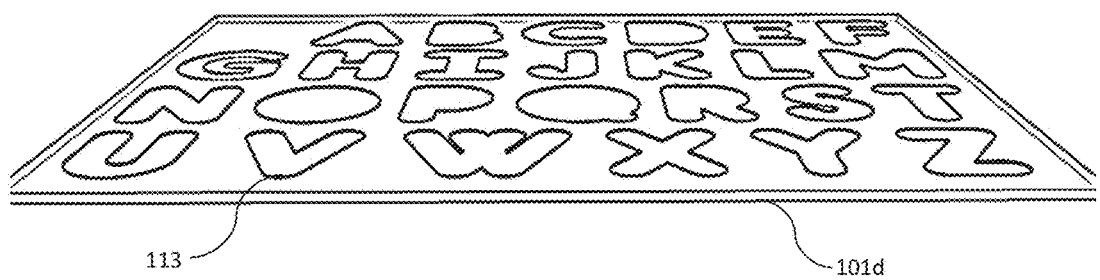
FIG. 30 shows the top perspective view of the bottom most layer of the base member in accordance with the fifth embodiment of the present invention.
Figure 31:
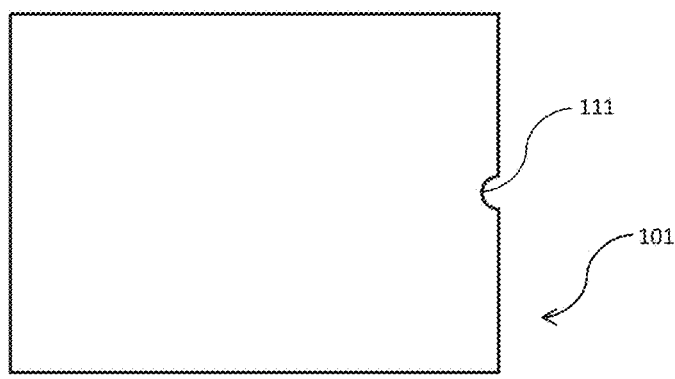
FIG. 31 shows the rear view of the base member in accordance with the first embodiment of the present invention.

FIG. 29 shows the bottom perspective view of the base member and the peg pieces in accordance with the fifth embodiment of the present invention. A bottom surface of the bottom most layer 101d of the base member 101 is etched with the alphabets 113, which helps the beginners to learn the basic alphabets. FIG. 30 shows the bottom perspective view of the bottom most layer of the base member in accordance with the fifth embodiment of the present invention. FIG. 31 shows the rear perspective view of the base member in accordance with the first embodiment of the present invention.

In the above embodiments, the image display members 103, 203 are shown as a flash card or tub sheet that is removable from the slots 102c, 202c. The flash card may be a simple card board with one or more images painted, pasted or etched on a top surface. In another embodiment, it may also be a transparent housing that encloses a sheet of images. In some other embodiment, the image display member 103 may also be an electronic display device such as a tablet computer or any other programmable display device. In this case, the electronic display device is installed with a software application that allows a teacher, trainer or parent to change the images displayed through the cut outs 102a, 202a. Similarly, the images may be changed automatically in a random manner, and also by accessing the electronic display device through a cloud server. Additionally, an audio device may also be included to provide audible instruction to the kid. For example, the alphabet or word may be pronounced, so that the kid can select a corresponding peg piece and place it in the respective cut out.

Since the image display member allows changing the images as per requirement, languages may be taught to kids in an effective and progressive manner while making the learning process more interesting. Moreover, the image display device 103, 203 connected to a cloud server allows to introduce newer words and images periodically and to maintain and track learning steps of the kids. In other embodiments, the simulator 100 may also include cut outs and peg pieces shaped as numbers and alphabets of other languages.

Figure 32:
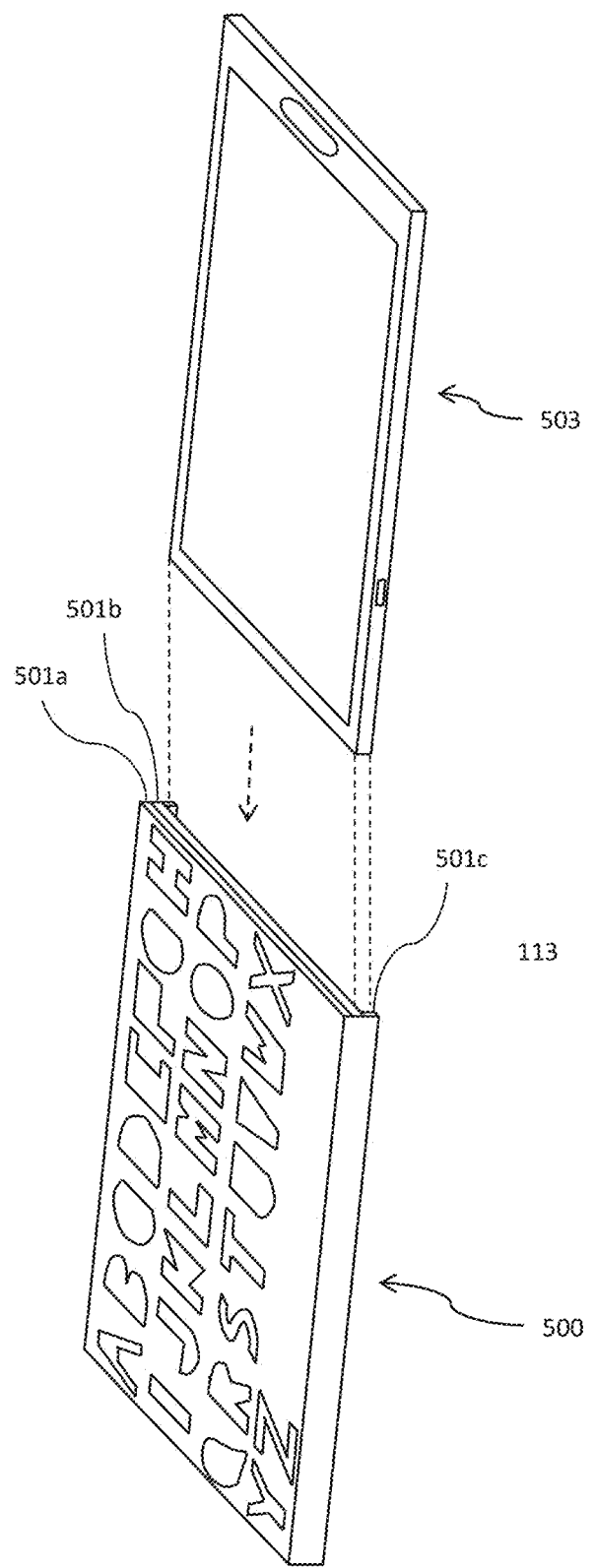
FIG. 32 shows the exploded perspective view of the educational toy simulator in accordance with the sixth embodiment of the present invention.

FIG. 32 shows the exploded perspective view of the educational toy simulator in accordance with the sixth embodiment of the present invention. The simulator 500 includes a base member 501 formed of only three layers 501a-501c. Instead of adding a dedicated layer for supporting the simulator, the image display member 503 which is an electronic device such as a tablet computer or any other flat panel display, is used as the substrate. The bottom most layer 501c is formed as a railing to receive and enclose the image display member 503 below the two top layers 501a-501b. When the base member 501 is placed over the image display member 503, the images assigned to the alphabets are displayed through the cut outs 502a. The image display member 503 includes a storage unit for storing the images and controller for controlling the display. The images displayed by the image display member 503 are automatically changed by a software application installed in the controller. The software application may also obtain the images from a cloud server and stores the same in the storage unit for further display. In another embodiment, the software application is installed in a cloud server to remotely control the image display member 503. In some other embodiment, the software application also allows using photos captured and stored through mobile phones or by the tablet computer, PDA and the like. The display member 503 may also include an audio means such as a loudspeaker for pronouncing aloud the alphabet and word through voice automation.

In case of using a printed image sheet or tub sheet as the image display member, the software application installed in a local device such as PDA, desktop computer and the like, may obtain a set of images to be assigned from the cloud server or local storage and composes a collage that may be printed to form the image display member or tub sheet. The software application uses a template in which the assigned images are positioned at corresponding locations that are aligned with the cut outs 502a to be visible to the learner. The software application analyses a history of images displayed and track the learner's development and progress of alphabet knowledge and selects the images to be displayed based on the analysis or user defined inputs.

The base member 501 may include a sensing or reading device positioned in the cut outs 502a to record a time taken by the learner for placing the correct peg piece 502 for each image. For example, the learner may take "x" seconds to place the A-shaped peg piece 502 upon seeing the image of an apple, while taking "x±t" seconds to place the same peg piece 502 upon seeing the image of an ant. Similarly, the time taken for each alphabet for different images is recorded for grading the development of alphabet knowledge and learners pace of language acquisition. This information about the development of alphabet knowledge allows the software application to generate the next collage of images that helps in further development of the learner's alphabet knowledge and language skills.

By varying images or pictures assigned for each letter or alphabet, teaching of language to the learner may be done in an effective and enjoyable manner. Furthermore, the cloud connected display member enables introducing newer words and images periodically and maintaining and tracking the learning steps of the learners.

Additionally, in another embodiment, a bottom surface of each peg piece may be covered with a special material such as rubber, fabric and the like, capable of being soaked in ink, so that each peg piece may be used as a letter stamp for imprinting corresponding letters on an ink printable medium to enhance learning experience.

Figure 33:
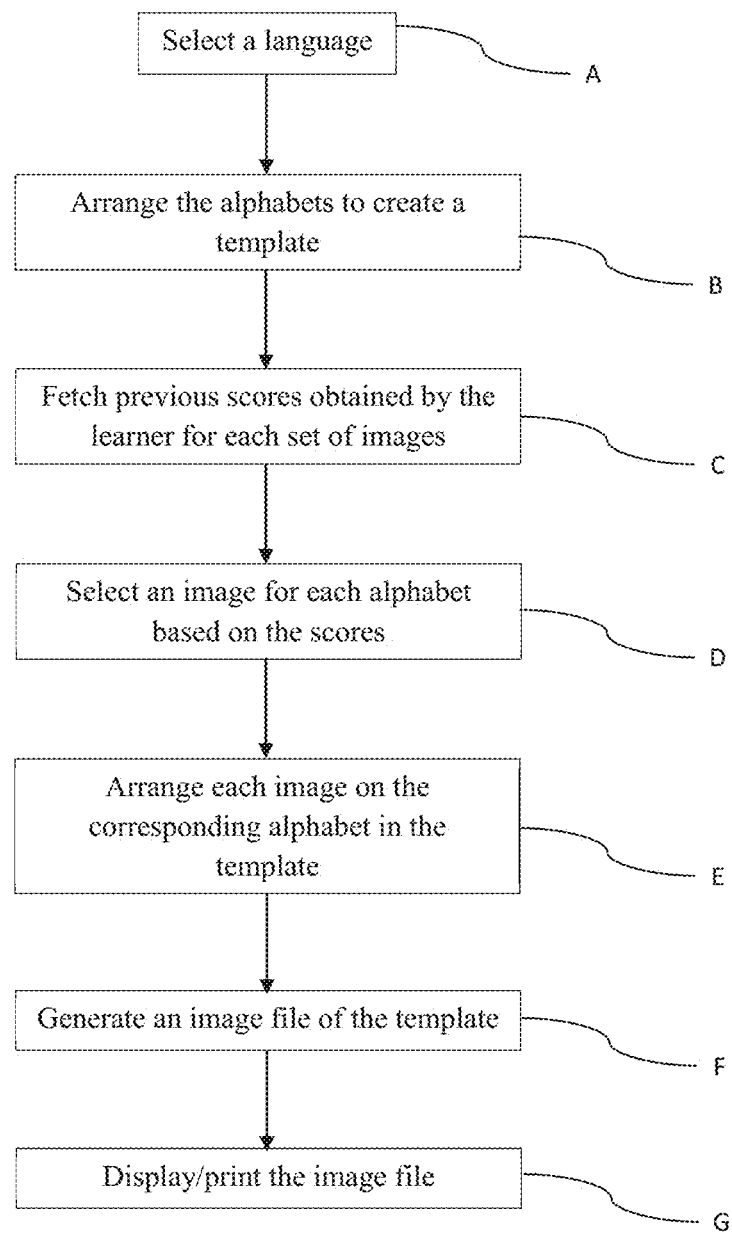
FIG. 33 shows the flow diagram of the process of generating an image file by the mobile application in accordance with the sixth embodiment of the present invention

FIG. 33 shows the flow diagram of the process of generating an image file by the mobile application in accordance with the sixth embodiment of the present invention. The process initiates at step A by selecting a language to be learnt or taught, and then arranging the alphabets of the language in an order to create a template aligned to the design of the base member for the given language, at step B. The template has to be in a size that is in proportion with a size of the simulator 100, 200, 500. For example, if the size of the simulator 100, 200,500 is in the ratio of 4:3, then the size of the template is also made to be in the ratio of 4:3. At step C, previous scores obtained by a learner for each set of images are fetched, and then, based on the scores or based on user defined choice or input, an image is selected for each alphabet at step D. The scores may be manually entered or automatically fetched from a storage device that maintains a record of scores for each learner. Similarly, the images may be selected from a local storage device storing a group of images or may be downloaded from a cloud server. For example, if the scores show that vocabulary knowledge of the learner has developed well to correlate an image of an apple to the alphabet "A", then the image of an ant is selected for "A". In this case, the image of ant may be obtained from the local storage device or from the cloud server. If the scores show that the learner needs further training, then the image of the apple is selected for "A". At step E, each selected image is arranged on the corresponding alphabet to which the image is assigned for. At step F, thus arranged template is generated as an image file, and then, finally, at step G, the image file is displayed or printed to be made available for displaying in the simulator 100, 200, 500. If the electronic device is used as the image display member 503, the image file is directly displayed by the device. In case of using a tub sheet as the image display members 103, 203, the image file is printed on a sheet that will be slid into the base members 101, 201. The image file may also be shared with multiple trainers to teach the language to multiple learners.

In another embodiment, the entire process may be executed in the cloud server and the image file may be transferred to the electronic device for display. Since the images associated with the alphabet may be changed from time to time, more vocabulary can be introduced to the child in a playful way, and, at the same time, a development in the knowledge of the child can also be recorded, analyzed and tracking, which leads to effective teaching without making the child feel bored.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

The many features and advantages of the present invention are apparent from the written description. The various aspects, features, embodiments or implementations of the invention described above can be used alone or in various combinations. Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as falling within the true spirit and scope of the invention.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

We claim:

1. An educational toy simulator for teaching a language, said simulator comprising:
   a base member formed of one or more layers;
   at least one peg piece;
   at least one cut out formed in said base member for receiving said peg piece;
   at least one slot formed in said base member;
   an image display member displaying at least one picture, wherein said slot is shaped to slidably receive said image display member for displaying said picture through said cut out, wherein the image display member is an electronic display device with a storage unit for storing said picture.

2. The educational toy simulator as claimed in claim 1, wherein said image display member is formed as a panel with said picture on a top surface of the panel.

3. The educational toy simulator as claimed in claim 1, wherein said image display member is a transparent case enclosing said picture.

4. The educational toy simulator as claimed in claim 1, wherein said image display member is connected to a cloud server for obtaining said picture to be displayed.

5. The educational toy simulator as claimed in claim 1, wherein said image display member includes an audio device for providing at least one audible instruction.

6. The educational toy simulator as claimed in claim 1, wherein said image display member includes a software application for selecting said picture to generate a printable image file.

7. The educational toy simulator as claimed in claim 6, wherein the software application selects said picture from the storage.

8. The educational toy simulator as claimed in claim 6, wherein the software application selects said picture from the cloud server.

9. The educational toy simulator as claimed in claim 1, wherein a depth of said peg piece is smaller than a depth of said cut out.

10. The educational toy simulator as claimed in claim 1, wherein said cut out includes two parts extending through two top layers of said base member.

11. The educational toy simulator as claimed in claim 10, wherein the two parts include an upper cut out part and a lower cut out part, and wherein the upper cut out part is wider than the lower cut out part.

12. The educational toy simulator as claimed in claim 11, wherein the two parts include an upper cut out part and a lower cut out part, and wherein said peg piece rests on top of the lower cut out part when said peg piece is received in said cut out.

13. The educational toy simulator as claimed in claim 1, wherein said cut out is formed as a tapered structure matching with a shape of said peg piece.

14. The educational toy simulator as claimed in claim 13, wherein a narrow portion of the tapered structure is at bottom of said cut out.

* * * * *